(12) United States Patent
Graham (10) Patent No.: US 8,308,151 B2
(45) Date of Patent: Nov. 13, 2012

(54) ELEVATOR ASSEMBLY FOR ROBOTIC POSITIONING OF A WORKPIECE

(75) Inventor: John Graham, Clinton Township, MI (US)

(73) Assignee: Comau Inc., Southfield, MI (US)

(*) Notice: Subject to any disclaimer, the term of this patent is extended or adjusted under 35 U.S.C. 154(b) by 980 days.

(21) Appl. No.: 12/263,527

(22) Filed: Nov. 3, 2008

(65) Prior Publication Data

US 2010/0107789 A1    May 6, 2010

(51) Int. Cl.
| | |
|---|---|
| B23Q 3/06 | (2006.01) |
| B66F 3/22 | (2006.01) |
| B66F 3/00 | (2006.01) |
| B66F 3/36 | (2006.01) |
| B66F 3/18 | (2006.01) |
| B66F 1/00 | (2006.01) |
| F16H 27/02 | (2006.01) |
| A47J 43/08 | (2006.01) |
| F16H 1/14 | (2006.01) |
| F16H 55/17 | (2006.01) |
| F16H 21/00 | (2006.01) |

(52) U.S. Cl. ........ 269/100; 254/122; 254/126; 254/100; 254/103; 254/105; 74/89; 74/16; 74/423; 74/435; 74/25

(58) Field of Classification Search .......... 254/122–126, 254/100, 103, 105; 74/89.16, 423, 435, 25
See application file for complete search history.

(56) References Cited

U.S. PATENT DOCUMENTS

| | | | |
|---|---|---|---|
| 3,592,146 A | 7/1971 | Loomans | |
| 4,589,621 A * | 5/1986 | Hunt et al. | .................. 248/586 |
| 4,712,971 A | 12/1987 | Fyler | |
| 4,815,396 A | 3/1989 | Gehring | |
| 5,180,276 A | 1/1993 | Hendrickson | |
| 5,402,737 A | 4/1995 | Kanazawa | |

* cited by examiner

Primary Examiner — Monica Carter
Assistant Examiner — Nirvana Deonauth
(74) Attorney, Agent, or Firm — Young Basile Hanlon & MacFarlane P.C.

(57) ABSTRACT

An elevator assembly includes a carrier, a first arm, and a second arm. Each arm has a primary portion pivotally connected to the carrier and a secondary portion pivotally connected to the primary portion. A first gear system interconnects the first arm and the second arm for synchronous rotation with respect to the carrier in opposite directions. A pair of second gear systems establish a geared relationship between the secondary portions of the arms and the carrier. A support member is connected to the secondary portions of the arms, wherein rotation of the primary portions of the arms with respect to the carrier drives the support member between a neutral position and at least a first extended position.

12 Claims, 12 Drawing Sheets

ELEVATOR ASSEMBLY FOR ROBOTIC POSITIONING OF A WORKPIECE

FIELD OF THE INVENTION

The present invention relates to the field of elevator assemblies, and in particular, to an elevator assembly that is robotically controlled to provide accurate positioning of a workpiece in an industrial environment.

BACKGROUND OF THE INVENTION

In the manufacturing industry, robotic systems are used to perform a variety of tasks, including positioning workpieces and assembling workpieces. In such systems, accurate positioning of the workpiece is critical and is thus an important design consideration. At the same time, it is necessary to minimize the space requirements and costs associated with robotic positioning systems. Accordingly, a number of technologies have been employed to provide accurate and efficient robotic positioning, including stepper motors, electronic position sensors, and machine vision systems.

Among robotic positioning systems, elevator assemblies present a unique challenge in that the structures that control the vertical position of the workpiece must necessarily support the entire mass of the workpiece. This challenge is further complicated when the workpiece in question is heavy. While a number of systems have been previously proposed and used for this purpose, there remains a need for a compact elevator assembly that is capable of accurately positioning heavy workpieces.

SUMMARY OF THE INVENTION

The present invention provides an elevator assembly for adjusting the height of a workpiece. The elevator assembly includes a carrier, a first arm, and a second arm. Each arm has a primary portion pivotally connected to the carrier and a secondary portion pivotally connected to the primary portion. The elevator assembly also includes a first gear system that interconnects the first arm and the second arm for synchronous rotation with respect to the carrier in opposite directions and a pair of second gear systems that establish a geared relationship between the secondary portions of the arms and the carrier. A support member is connected to the secondary portions of the arms, wherein rotation of the primary portions of the arms with respect to the carrier drives the support member between a neutral position and at least a first extended position.

Each second gear system may have a first plurality of gear teeth connected to the carrier in a fixed angular relationship with respect to the carrier and a second plurality of gear teeth connected to the secondary portion of the respective arm in a fixed angular relationship therewith, wherein the second plurality of gear teeth are in a geared relationship with the first plurality of gear teeth. Additionally, each second gear system may have at least one intermediate gear to provide the geared relationship between the first plurality of gear teeth and the second plurality of gear teeth. The intermediate gears may be pivotally mounted to respective primary portions of the first and second arms.

The first gear system may have a third plurality of gear teeth that are connected to the primary portion of the first arm and a fourth plurality of gear teeth that are connected to the primary portion of the second arm, wherein meshing engagement of the third plurality of gear teeth and the fourth plurality of gear teeth interconnect the first arm and the second arm.

The primary portion of the first arm may be connected to the carrier at a first joint and the primary portion of the second arm may be connected to the carrier at a second joint, wherein a neutral plane is defined through the first joint and the second joint, and the support member travels along a line of action that is substantially perpendicular to the neutral plane and the support member extends along the neutral plane when the support member is in the neutral position.

The support member may be disposed on a first side of the neutral plane when the support member is in the first extended position, where the support member is moveable to a second extended position and the support member is disposed on a second side of the neutral plane when the support member is in the second extended position. Furthermore, the support member may remain substantially parallel to the neutral plane as it moves between the neutral position and the first extended position. Additionally, the primary portion of the first arm, the secondary portion of the first arm, the primary portion of the second arm and the secondary portion of the second arm may all extend substantially parallel to one another in the neutral position.

BRIEF DESCRIPTION OF THE DRAWINGS

Various other uses of the present invention will become more apparent by referring to the following detailed descriptions and drawings, and which.

DETAILED DESCRIPTION OF THE EMBODIMENTS

Referring to the drawings, the present invention will now be described in detail with reference to the disclosed embodiments.

Figure 1:
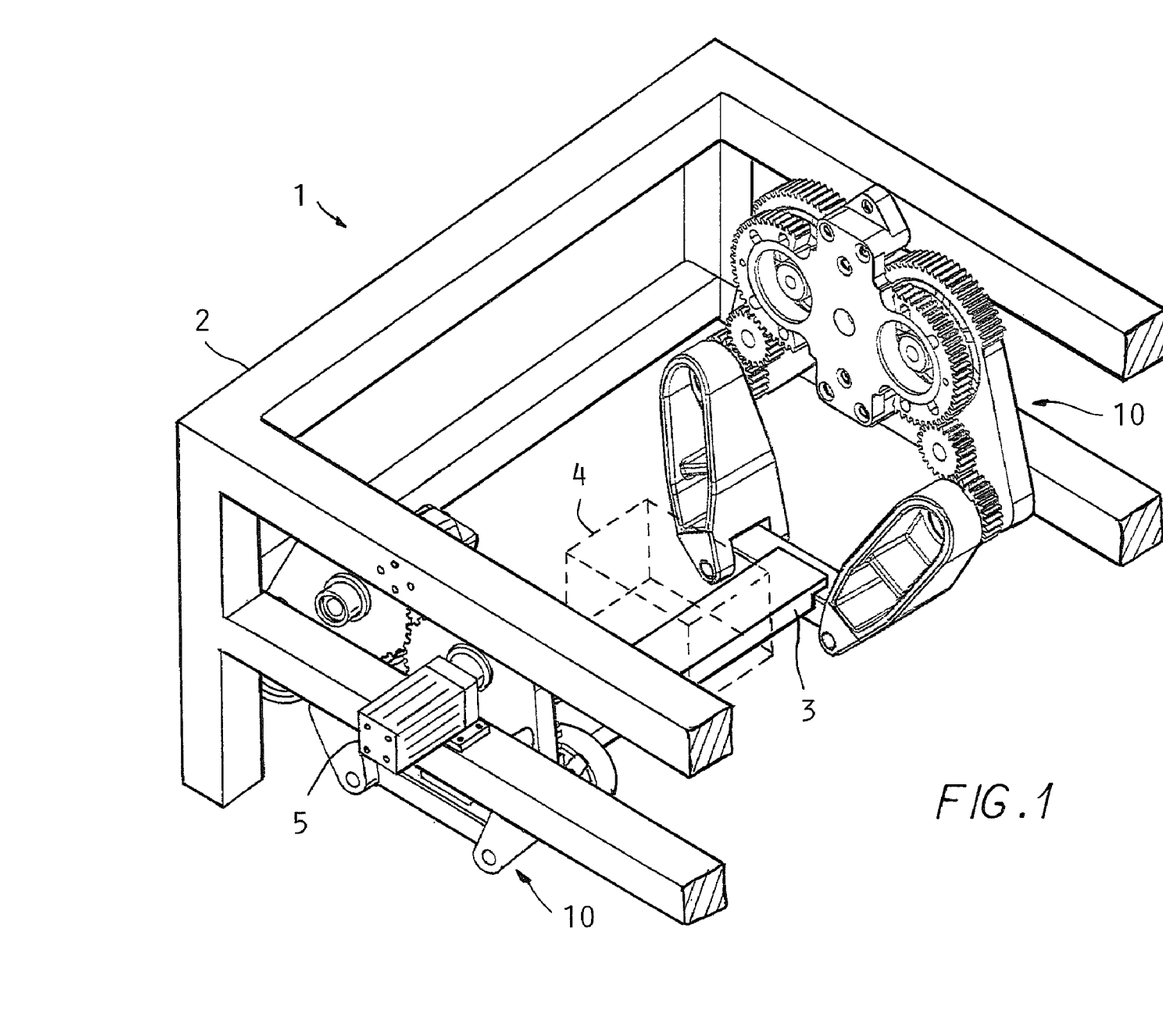
FIG. 1 is a perspective view showing an elevator system that includes a pair of elevator assemblies according to the invention.

FIG. 1 shows a workpiece positioning system 1 that includes a pair of elevator assemblies 10 according to the present invention. The elevator assemblies 10 are mounted to a support structure 2 of the workpiece positioning system 1. A carriage 3 is supported by and suspended between the elevator assemblies 10, and a workpiece 4 is disposed on and carried by the carriage 3. In order to drive the elevator assemblies 10 and thereby provide elevational positioning of the workpiece 4, a servo motor 5 is operatively connected to at least one of the elevator assemblies 10. Although the workpiece positioning system 1 of the present invention is ideally suited for heavy workpieces 4, such as the cylinder block of an internal combustion engine, the workpiece positioning system 1 may be used on a variety of different workpieces 4.

Figure 2:
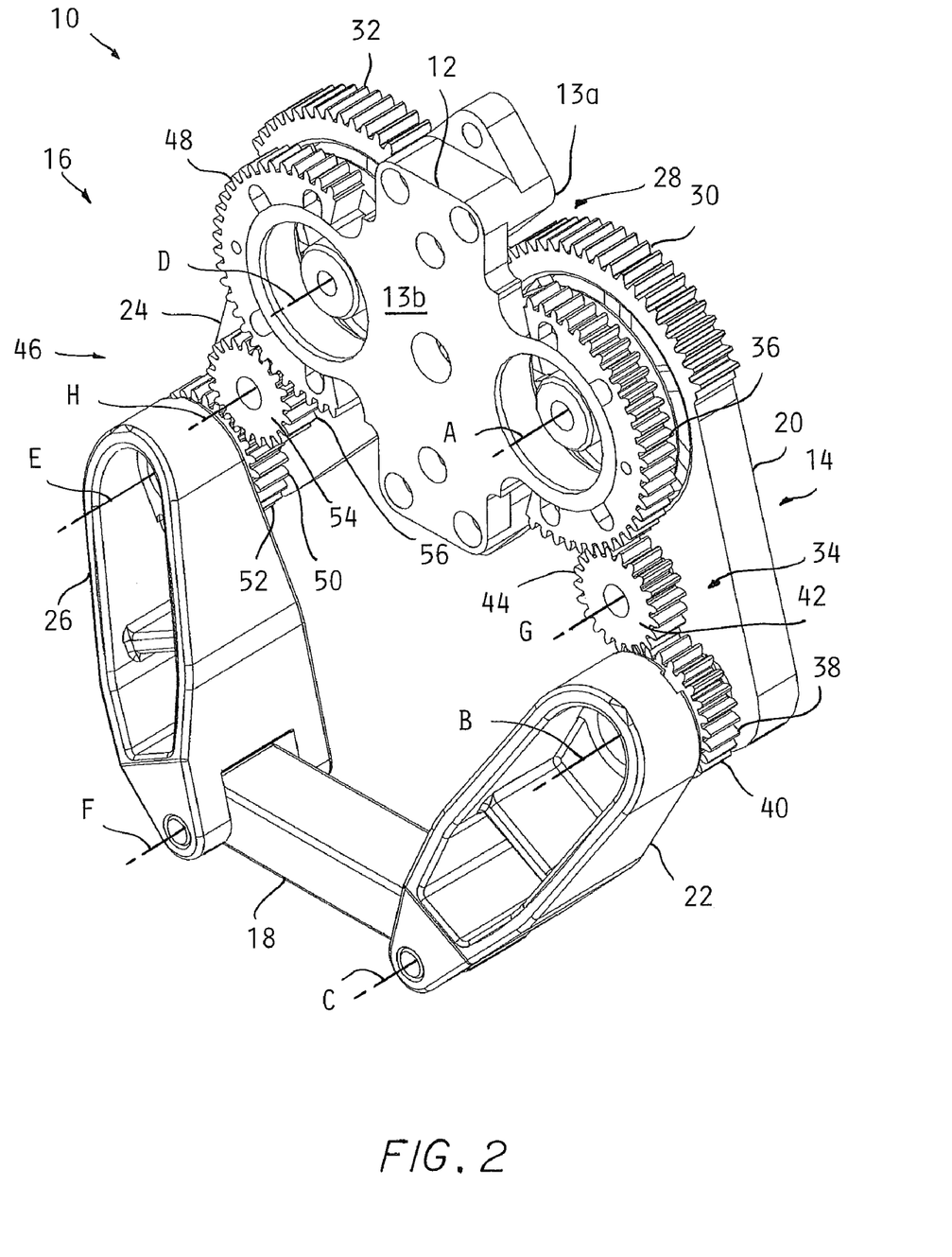
FIG. 2 is a perspective view showing the elevator assembly of FIG. 1.
Figure 3:
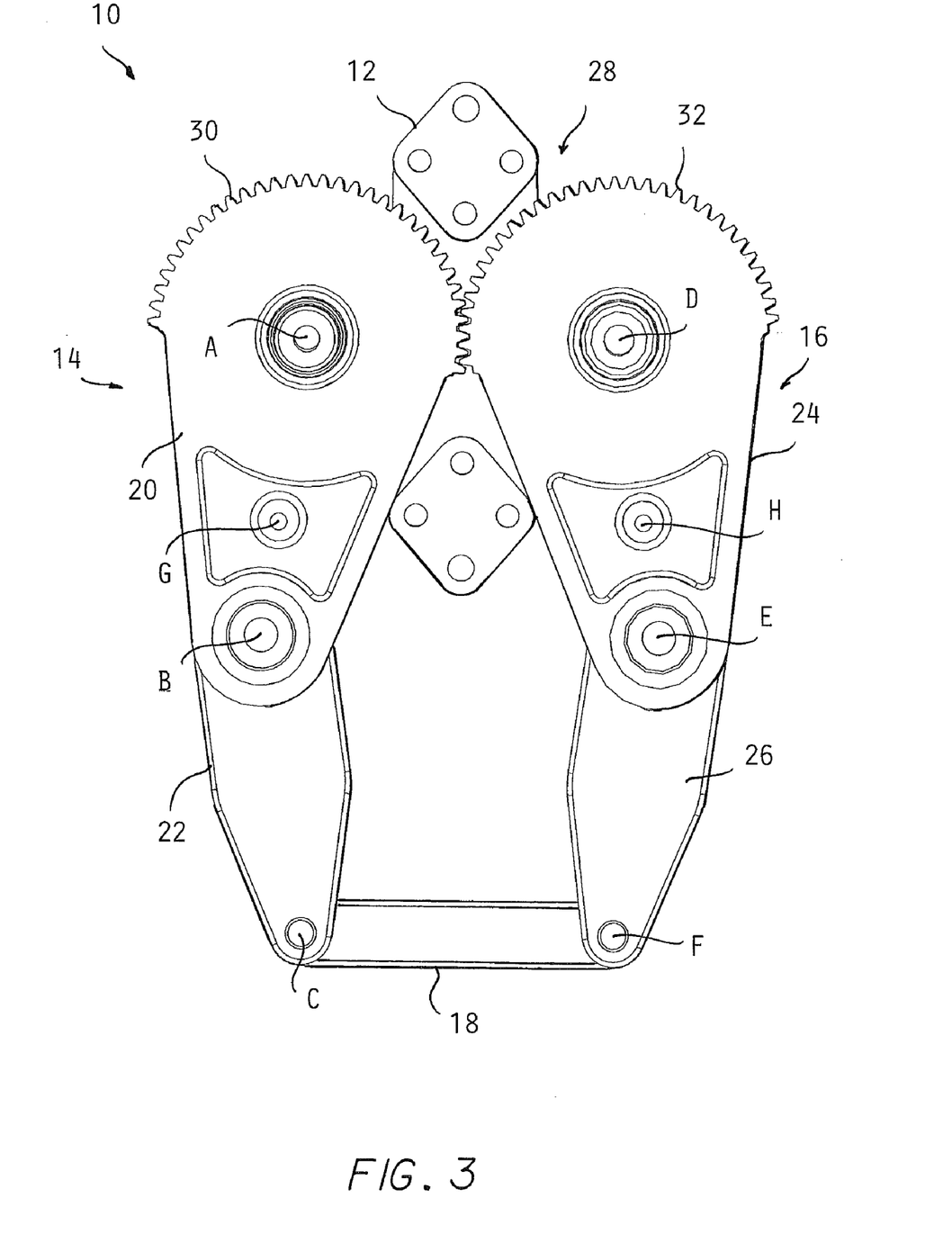
FIG. 3 is a rear view showing the elevator assembly of FIG. 1.

In order to provide elevational positioning of the workpiece 4, the elevator assembly 10 includes a carrier 12, a first arm 14, and a second arm 16, as shown in FIGS. 2-3. The first arm 14 and the second arm 16 are articulated structures that cooperate to move the support member 18 between a neutral position, a first extended position, and a second extended position. For example, the first extended position may be a lowered position, wherein the workpiece 4 may be loaded or unloaded from the positioning system 1, while the second extended position may be a raised position, wherein the workpiece 4 is positioned with respect to an industrial tool (not shown) so that a manufacturing operation can be performed on the workpiece 4. The first arm 14 and the second arm 16 are both pivotally mounted to the carrier 12 and to a support member 18, to which the carriage 3 of the positioning system may be attached. The pivotal connections between the arms 14, 16 and the carrier 12, as well as between the various other portions of the elevator assembly 10, may be accomplished using any suitable conventional structures including pins, bearings, and suitable fasteners.

Figure 4:
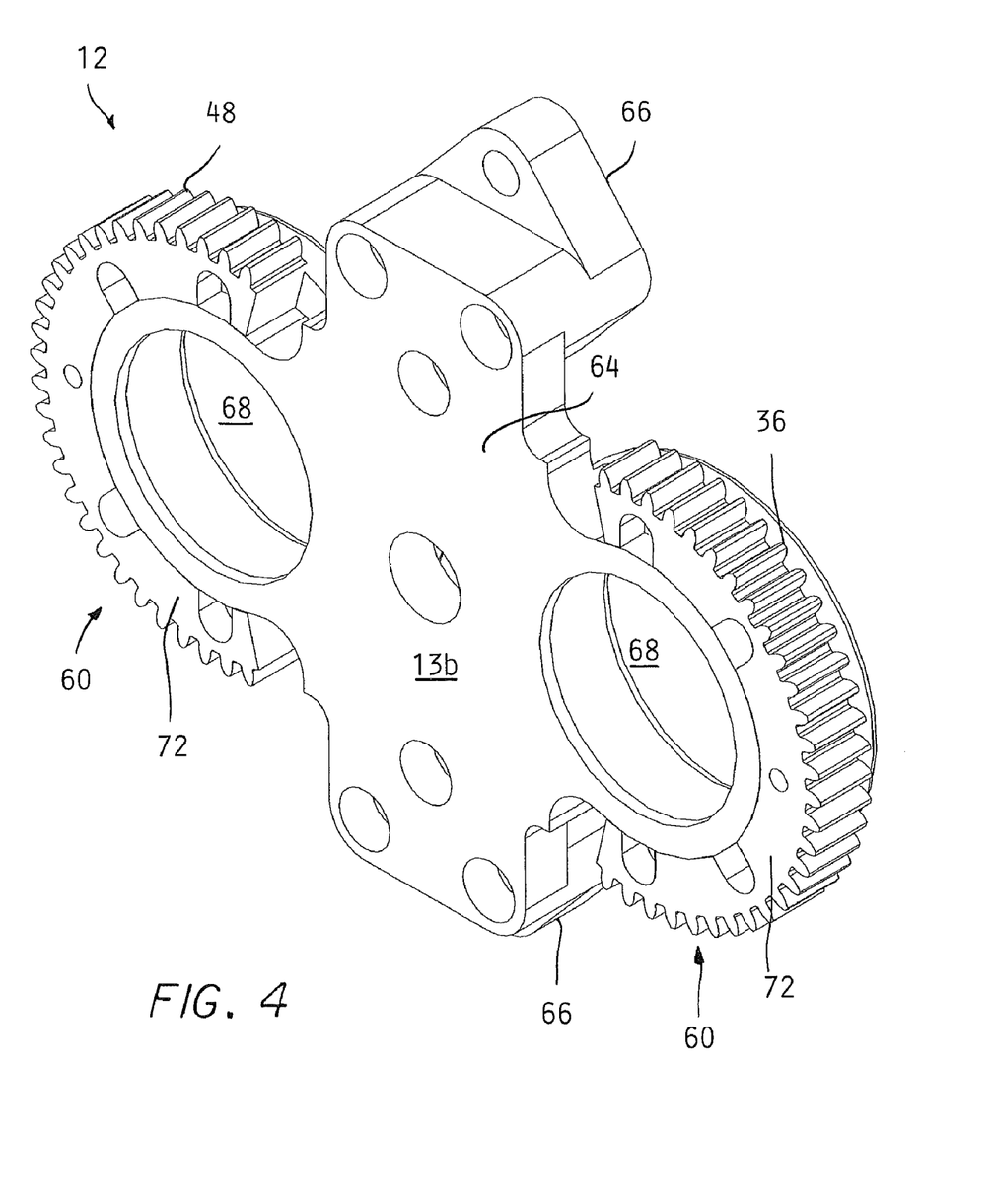
FIG. 4 is a front perspective view showing a carrier.
Figure 5:
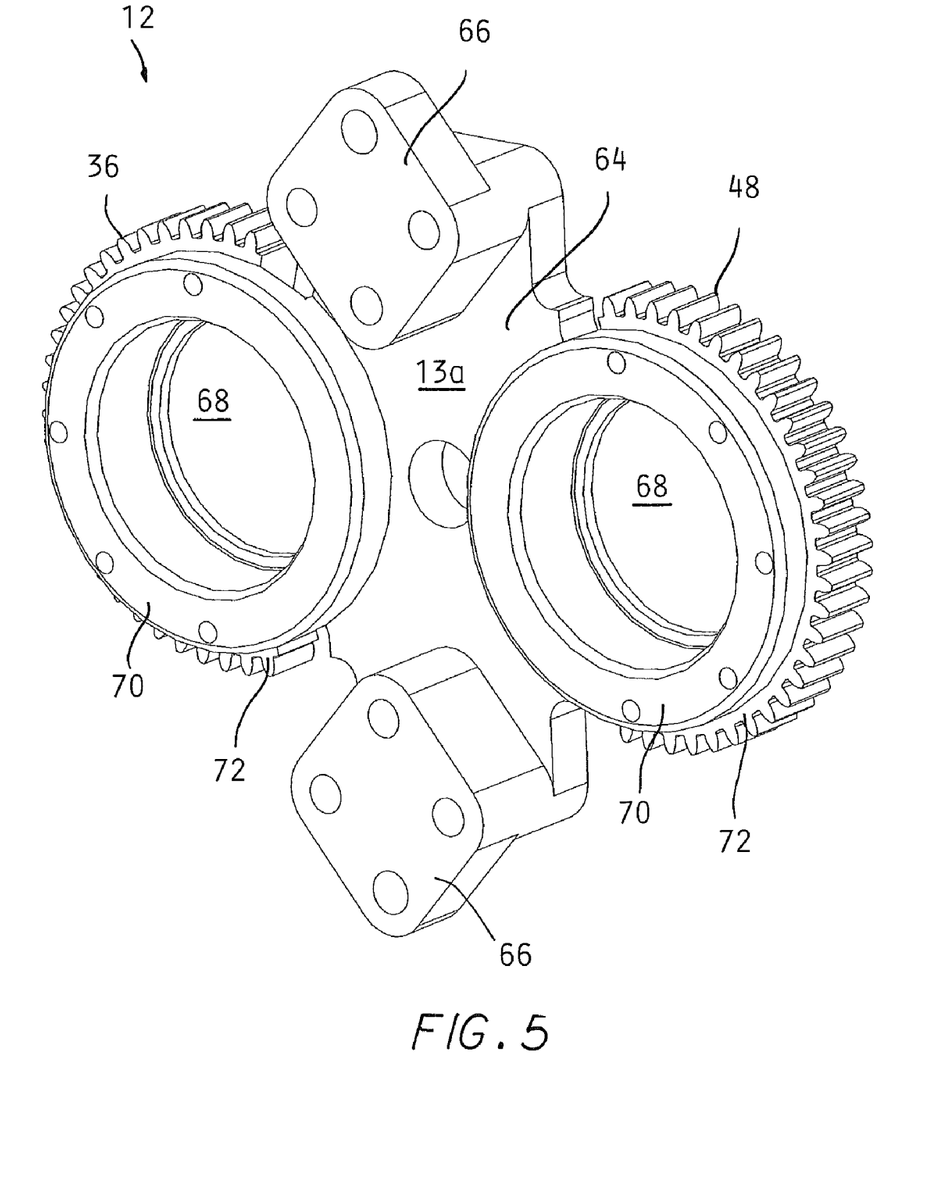
FIG. 5 is a rear perspective view showing the carrier of FIG. 4.

In order to support the first arm 14 and the second arm 16, the carrier 12 is a substantially symmetric structure that includes a pair of lobes 60 for mounting the first arm 14 and the second arm 16, as seen in FIGS. 4-5. The lobes 60 are interconnected and laterally spaced from one another by a central portion 64. To connect the carrier to the support structure 2, a pair of mounting brackets 66 is provided on the central portion 64 to the carrier 12 in a stacked configuration and may be fastened to the support structure 2 by suitable hardware, such as bolts. The lobes 60 each include a circular opening 68 that extends through the carrier in a location corresponding to one of axis A or axis B, respectively, as shown in FIG. 2. An annular rim 70 surrounds each circular opening 68 to provide structure to which the first and second arms 14, 16 may be seated for rotation with respect to the carrier 12. A first plurality of gear teeth 36 of a first articulating gear system 34 and a first plurality of gear teeth 48 of a second articulating gear system 46 are provided on the carrier 12. The pluralities of gear teeth 36, 48 may be formed on detachable rim portions 72 of the carrier 12 that are rigidly connected to the lobes 60 by suitable fasteners or are formed integrally with the carrier 12 on the lobes 60 thereof.

Referring again to FIGS. 2-3, the first arm 14 includes a primary portion 20 that is pivotally connected to a rear side 13a of the carrier 12 at axis A and is pivotally connected to a secondary portion 22 of the first arm 14 at axis B. The secondary portion 22 of the first arm 14 is pivotally connected to the support member 18 at axis C. While the primary portion 20 of the first arm 14 is disposed on the rear side 13a of the carrier 12, the secondary portion 22 of the first arm 14 is spaced from the primary portion 20 by a positioner gear 40, such that the secondary portion 22 of the first arm 14 and the support member 18 may move past and adjacent to a front side 13b of the carrier 12 without causing mechanical interference with the carrier 12.

Figure 6:
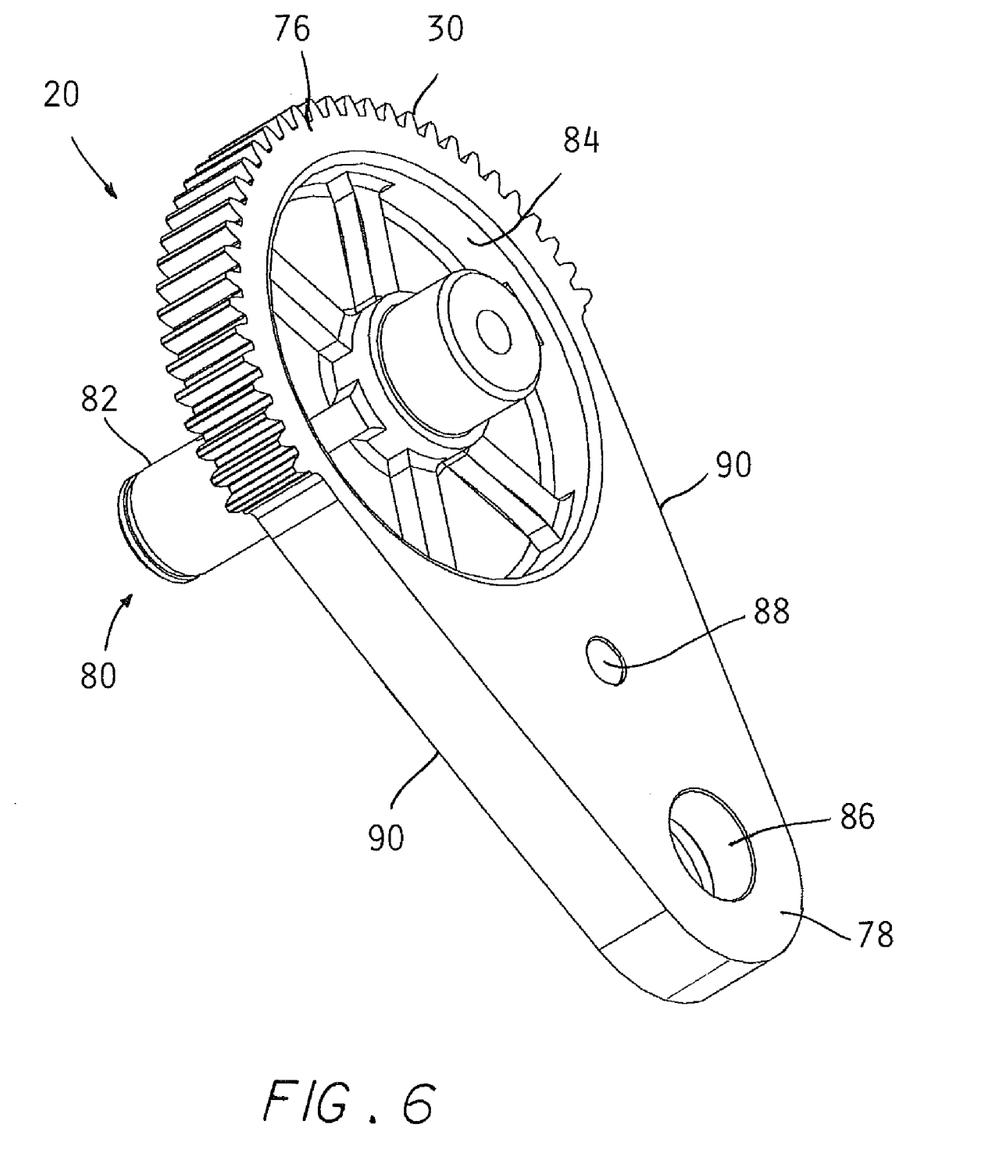
FIG. 6 is a front perspective view showing a primary portion of a first arm.
Figure 7:
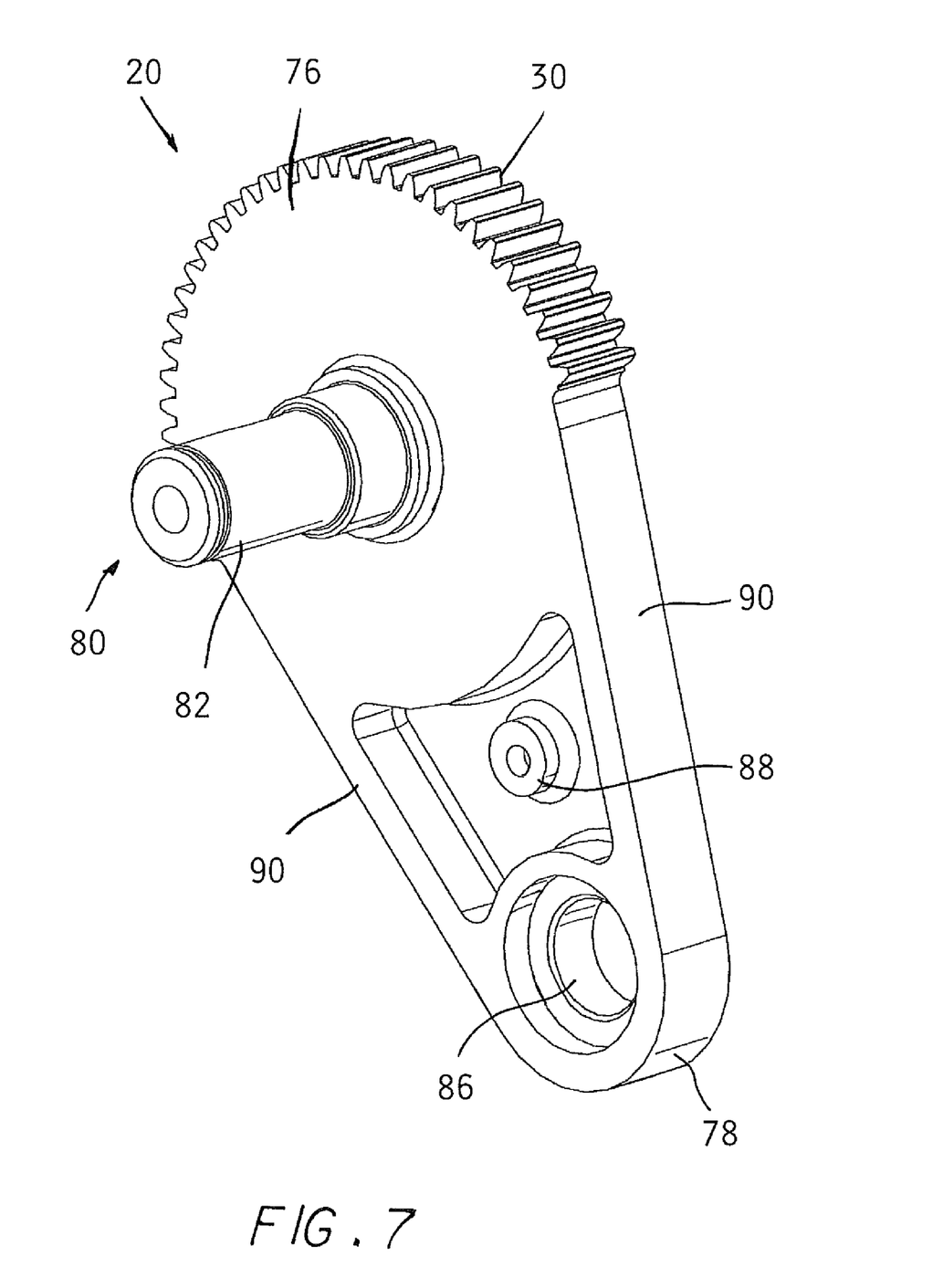
FIG. 7 is a rear perspective view showing the primary portion of the first arm.

As shown in FIGS. 6-7, the primary portion 20 of the first arm 14 extends from a first end 76 to a second end 78. A mounting structure 80 is provided at the first end 76 of the primary portion 20 and may include, for example, a center post 82 that lies along axis A, as shown in FIG. 2, and an internal annular lip 84. The internal annular lip 84 is adapted to complementarily engage the annular rim 70 of the carrier 12. Furthermore, the internal annular lip 84 is formed opposite a first plurality of gear teeth 30 of an interlock gear system 28, which will be explained herein. To drive motion of the elevator assembly 10, the servo motor 5 of the positioning system 1 may be connected to the center post 82. A first mounting aperture 86 may be provided at the second end 78 of the primary portion 20 along axis B, as shown in FIG. 2, for connection to the secondary portion 22 and the positioner gear 40. A second mounting aperture 88 may be provided at an intermediate position between the first and second ends 76, 78 of the primary portion 20 along axis G, as shown in FIG. 2, for connection of the intermediate gear 42. The primary portion 20 may have a substantially plate-like, sno-cone shape that tapers along substantially straight sides 90 from the larger first end 76 to the smaller second end 78, each of which is rounded.

Figure 8:
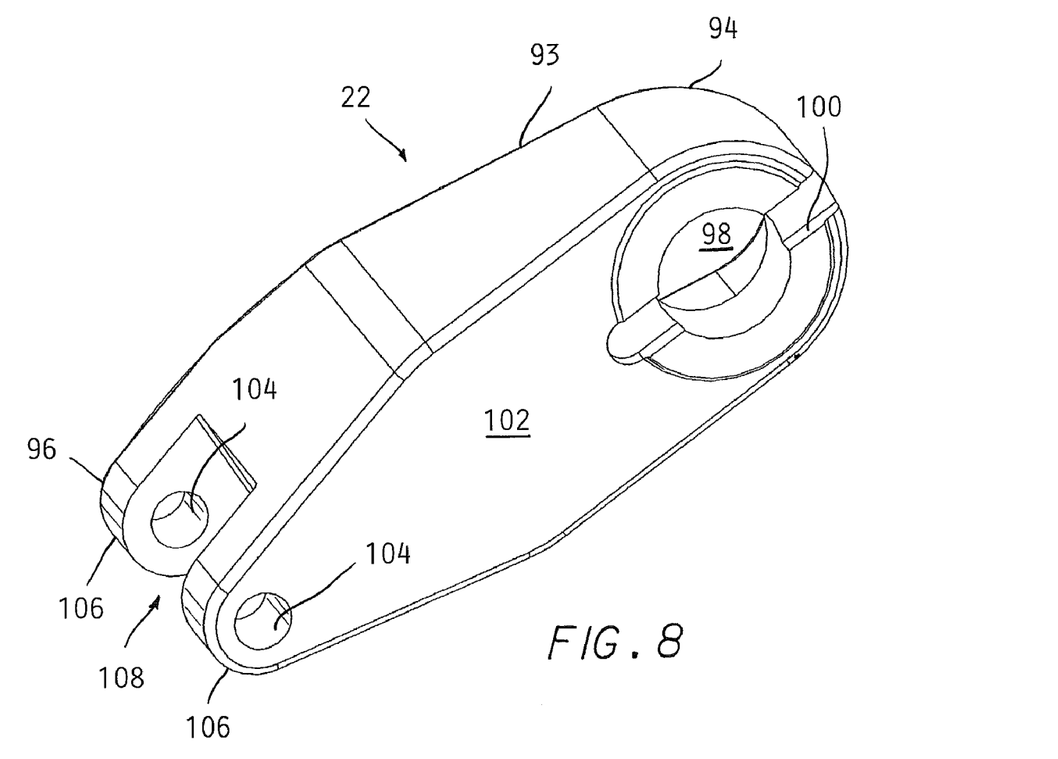
FIG. 8 is a perspective view showing a secondary arm portion of the first arm.

The articulated structure of the first arm 14 is provided by pivotally mounting the secondary portion 22 of the first arm 14 to the primary portion 20 of the first arm 14. As shown in FIG. 8, the secondary portion 22 of the first arm 14 extends from a rounded first end 94 to a rounded second end 96. A mounting aperture 98 is provided at the first end 94 of the secondary portion 22 for connection to the primary portion 20 of the first arm 14 along axis B. A locking notch 100 is formed in a front surface 102 of the secondary portion 22 for engagement with the positioner gear 40 to establish a fixed angular relationship between the secondary portion 22 and the positioner gear 40, such that the positioner gear 40 does not rotate with respect to the secondary portion 22. The locking notch 100 straddles the mounting aperture 98 in a radial direction with respect to the mounting aperture 98 and has a depth defined in a direction corresponding to the longitudinal dimension of the mounting aperture 98. At the second end 96 of the secondary portion 22 of the first arm 14, a pair of mounting apertures 104 is provided for connection of the secondary portion 22 to the support member 18 along axis C, as shown in FIG. 2. The mounting apertures 104 are formed on respective ones of a pair of spaced projections 106, which define a C-shaped configuration at the second end 96 of the secondary portion 22. The mounting apertures 104 align with respect to one another, and a gap 108 is defined between the projections 106, such that the support member 18 may be received between the projections 106, and the support member 18 may be pivotally connected to the secondary portion 22 of the first arm 14 using the pair of mounting apertures 104.

Figure 9:
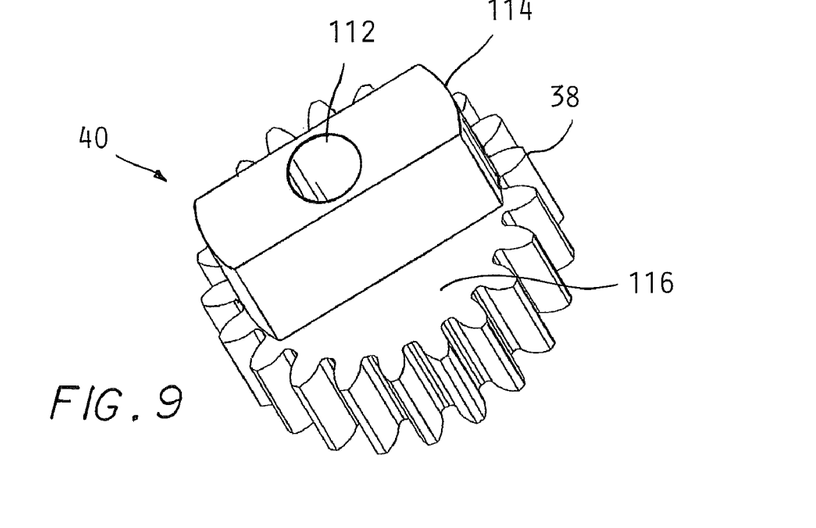
FIG. 9 is a perspective view showing a positioning gear of the first arm.

As shown in FIG. 9, the positioner gear 40 of the first arm 14 includes a second plurality of gear teeth 38, which are part of the first articulating gear system 34. The gear teeth of the second plurality of gear teeth 38 are formed on the radial face of the positioner gear 40 and are arrayed around a central aperture 112. The central aperture 112 provides for connection of the positioner gear 40 to the secondary portion 22 of the first arm 14 at axis B, as shown in FIG. 2. In order to fix the angular position of the positioner gear 40 with respect to the secondary portion 22 of the first arm 14, a locking tab 114 extends axially outward from an axial face 116 of the positioner gear 40 and straddles the central aperture 112. The locking tab 114 is substantially rectangular and is dimensioned to cooperatively engage the locking notch 100 of the secondary portion 22 of the first arm 14 in order to restrain rotation of the positioner gear 40 with respect to the secondary portion 22 of the first arm 14.

Referring again to FIGS. 2-3, the second arm 16 of the elevator assembly 10 is constructed similar to the first arm 14 of the elevator assembly 10. The second arm 16 includes a primary portion 24 that is pivotally connected to the rear side 13a of the carrier 12 at axis D and is pivotally connected to a secondary portion 26 of the second arm 16 at axis E. The primary and secondary portions 24, 26 of the second arm 16 are substantially identical in construction to the primary and secondary portions 20, 22 of the first arm. The secondary portion 26 of the second arm 16 is pivotally connected to the support member 18 at axis F. While the primary portion 24 of the second arm 16 is disposed on the rear side 13a of the carrier 12, the secondary portion 26 of the second arm 16 is spaced from the primary portion 20 by a positioner gear 52, which is substantially identical in construction to the positioner gear 40 of the first arm 14, such that the secondary portion 26 of the second arm 16 and the support member 18 may move past the front side 13b of the carrier 12 without causing mechanical interference with the carrier 12.

To synchronize the motion of the first arm 14 and the second arm 16 of the workpiece positioning system 1, the elevator assembly 10 includes the interlock gear system 28 that interconnects the first arm 14 and the second arm 16 so that rotation of the first arm 14 with respect to the carrier 12 induces rotation of the second arm 16 with respect to the carrier 12. The interlock gear system 28 includes the first plurality of gear teeth 30, which are arranged on the primary portion 20 of the first arm 14 in a substantially semi-circular formation having its center point at axis A. The interlock gear system 28 also includes a second plurality of gear teeth 32, which are arranged on the primary portion 24 of the second arm 16 in a substantially semi-circular formation having its center point at axis D.

In order to drive rotation of the primary portion 24 of the second arm 16 with respect to the carrier 12 about axis D when the primary portion 20 of the first arm 14 rotates with respect to the carrier 12 about axis A, the first plurality of gear teeth 30 of the interlock gear system 28 meshingly engage the second plurality of gear teeth 32 of the interlock gear system 28. Because the first and second pluralities of gear teeth 30, 32 of the interlock gear system 28 are both pluralities of external gear teeth, the interlock gear system 28 causes the primary portion 20 of the first arm 14 and the primary portion 24 of the second arm 16 to rotate in opposite directions with respect to one another. However, because the first and second pluralities of gear teeth 30, 32 of the interlock gear system 28 are disposed in semi-circles of equal radius, the rotational movements of the primary portion 20 of the first arm 14 and the primary portion 24 of the second arm 16 are equal in magnitude.

To control articulation of the first arm 14, the elevator assembly 10 includes the first articulating gear system 34 that establishes a geared relationship between the carrier 12 and the secondary portion 22 of the first arm 14, such that rotation of the primary portion 20 of the first arm 14 induces rotation of the secondary portion 22 of the first arm 14. In particular, the first articulating gear system 34 is configured to articulate the secondary portion 22 of the first arm 14 with respect to the primary portion 20 of the first arm 14 about axis B in response to rotation of the primary portion 20 of the first arm 14 with respect to the carrier 12 about axis A.

The primary components of the first articulating gear system 34 include the first plurality of gear teeth 36, which are arranged on the carrier 12 in a substantially semi-circular formation having its center point at axis A, and the second plurality of gear teeth 38, which are connected to the secondary portion 22 of the first arm 14 in a substantially circular or semi-circular formation having its center point at axis B. In the embodiment shown herein, the second plurality of gear teeth 38 are provided on the positioner gear 40, which is disposed in a fixed rotational position with respect to the secondary portion 22 of the first arm 14, as will be explained in detail herein. However, the second plurality of gear teeth 38 could be formed integrally on the secondary portion 22 of the first arm 14. Because the first plurality of gear teeth 36 of the first articulating gear system 34 is mounted on the carrier 12, and the second plurality of gear teeth 38 of the first articulating gear system 34 is mounted on the secondary portion 22 of the first arm 14, the second plurality of gear teeth 38 is epicyclically mounted with respect to the first plurality of gear teeth 36, because axis B pivots around axis A as the primary portion 20 pivots with respect to the carrier 12.

The geared relationship of the first plurality of gear teeth 36 and the second plurality of gear teeth 38 of the first articulating gear system 34 may be established by an intermediate gear 42 having a plurality of gear teeth 44 formed thereon. The intermediate gear 42 is disposed between and meshingly engaged with both the first plurality of gear teeth 36 and the second plurality of gear teeth 38 of the first articulating gear system 34 to transfer torque between the first plurality of gear teeth 36 and the second plurality of gear teeth 38. The intermediate gear 42 is pivotally connected to the primary portion 20 of the first arm 14 for rotation with respect to the primary portion 20 about axis G, which is parallel to axis A and axis B. Thus, when the primary portion 20 of the first arm 14 rotates in a clockwise direction with respect to the carrier 12 about axis A, the epicyclic mounting of the intermediate gear 42 of the first articulating gear system 34 causes the intermediate gear 42 to rotate clockwise due to meshing engagement with the first plurality of gear teeth 36 while causing the second plurality of gear teeth 38 to rotate counter-clockwise. However, it should be understood that the invention is not limited to the inclusion of a single intermediate gear 42, but rather, the present invention could be provided with any means that establishes a geared relationship between the first plurality of gear teeth 36 and the second plurality of gear teeth 38 of the first articulating gear system 34 that maintains an opposite rotational direction at axis B as compared to axis A. For example, the first articulating gear system 34 could be provided with any odd number of intermediate gears 42.

To control articulation of the second arm 16, the elevator assembly 10 includes a second articulating gear system 46 that establishes a geared relationship between the carrier 12 and the secondary portion 26 of the second arm 16, such that rotation of the primary portion 24 of the second arm 16 induces rotation of the secondary portion 26 of the second arm 16. In particular, the second articulating gear system 46 is configured to articulate the secondary portion 26 of the second arm 16 with respect to the primary portion 24 of the second arm 16 about axis E in response to rotation of the primary portion 24 of the second arm 16 with respect to the carrier 12 about axis D.

The primary components of the second articulating gear system 46 include a first plurality of gear teeth 48 arranged on the carrier 12 in a substantially semi-circular formation having its center point at axis D and a second plurality of gear teeth 50 connected to the secondary portion 26 of the second arm 16 in a substantially semi-circular formation having its center point at axis E. In the embodiment shown herein, the second plurality of gear teeth 50 is provided on a positioner gear 52, which is disposed in a fixed rotational position with respect to the secondary portion 26 of the second arm 16, as will be explained in detail herein. However, the second plurality of gear teeth 50 could be formed integrally on the secondary portion 26 of the second arm 16. Because the first plurality of gear teeth 48 of the second articulating gear system 46 is mounted on the carrier 12, and the second plurality of gear teeth 50 of the second articulating gear system 46 is mounted on the secondary portion 26 of the second arm 16, the second plurality of gear teeth 50 is epicyclically mounted with respect to the first plurality of gear teeth 48, because axis E pivots around axis A as the primary portion 24 pivots with respect to the carrier 12.

The geared relationship of the first plurality of gear teeth 48 and the second plurality of gear teeth 50 of the second articulating gear system 46 may be established by an intermediate gear 54 having a plurality of gear teeth 56 formed thereon. The intermediate gear 54 is disposed between and meshingly engaged with both the first plurality of gear teeth 48 and the second plurality of gear teeth 50 of the second articulating gear system 46 to transfer torque between the first plurality of gear teeth 48 and the second plurality of gear teeth 50. The intermediate gear 54 is pivotally connected to the primary portion 24 of the second arm 16 for rotation with respect to the primary portion 24 about axis H, which is parallel to axis A and axis B. Thus, when the primary portion 24 of the second arm 16 rotates in a clockwise direction with respect to the carrier 12 about axis D, the epicyclic mounting of the intermediate gear 54 of the second articulating gear system 46 causes the intermediate gear 54 to rotate clockwise due to meshing engagement with the first plurality of gear teeth 48, while causing the second plurality of gear teeth 50 to rotate counter-clockwise. However, it should be understood that the invention is not limited to the inclusion of a single intermediate gear 54, but rather, the present invention could be provided with any means that establishes a geared relationship between the first plurality of gear teeth 48 and the second plurality of gear teeth 50 of the second articulating gear system 46 that maintains an opposite rotational direction at axis E as compared to axis D. For example, the second articulating gear system 46 could be provided with any odd number of intermediate gears 54.

Figure 10A:
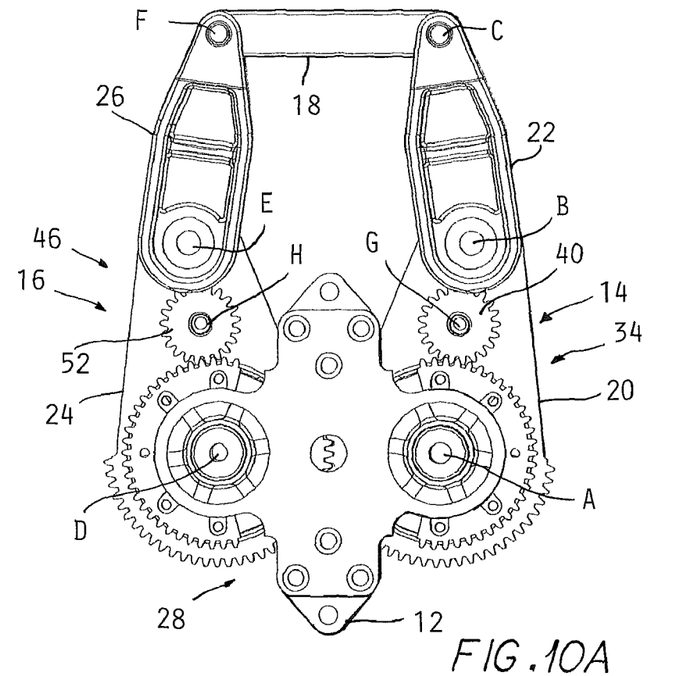
FIG. 10A shows the elevator assembly in a first extended position.
Figure 10B:
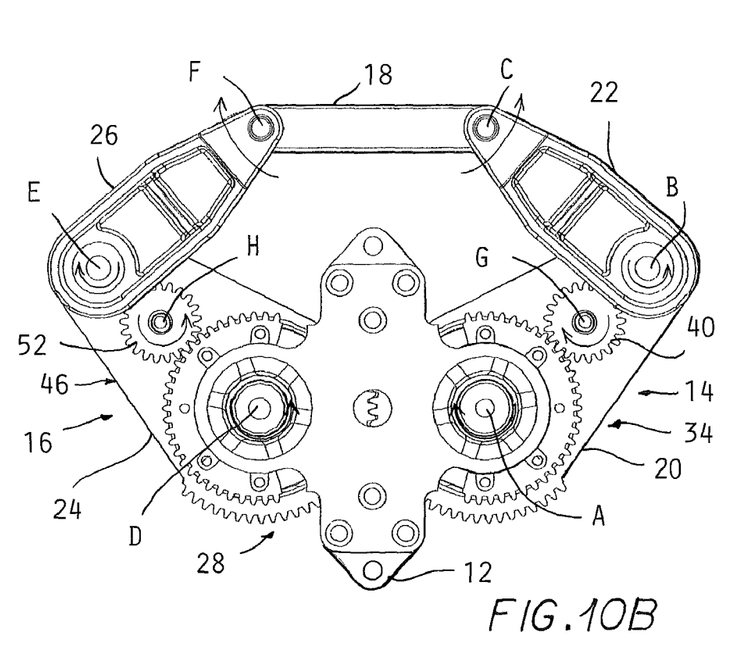
FIG. 10B shows the elevator assembly in an intermediate position between the first extended position and a neutral position.
Figure 10C:
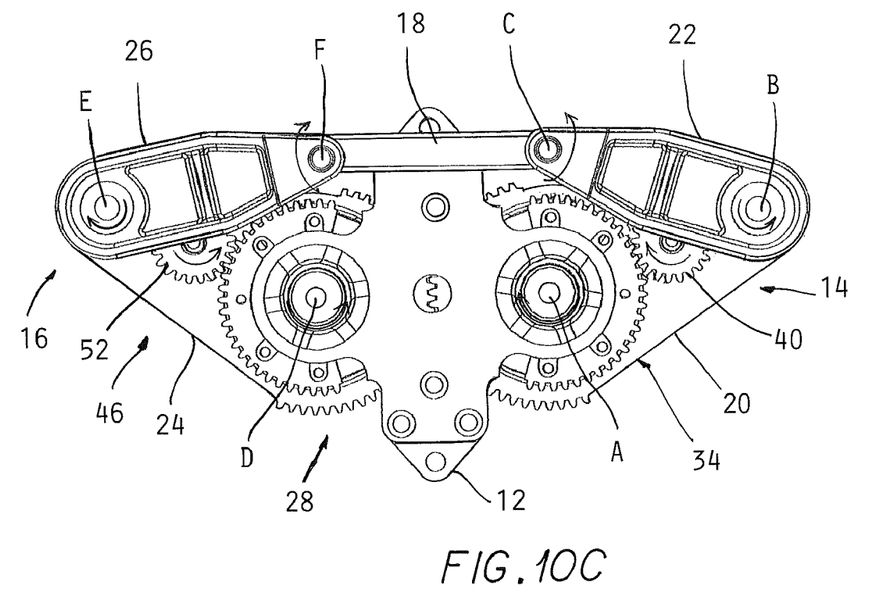
FIG. 10C shows the elevator assembly in an intermediate position between the first extended position and the neutral position.
Figure 10D:
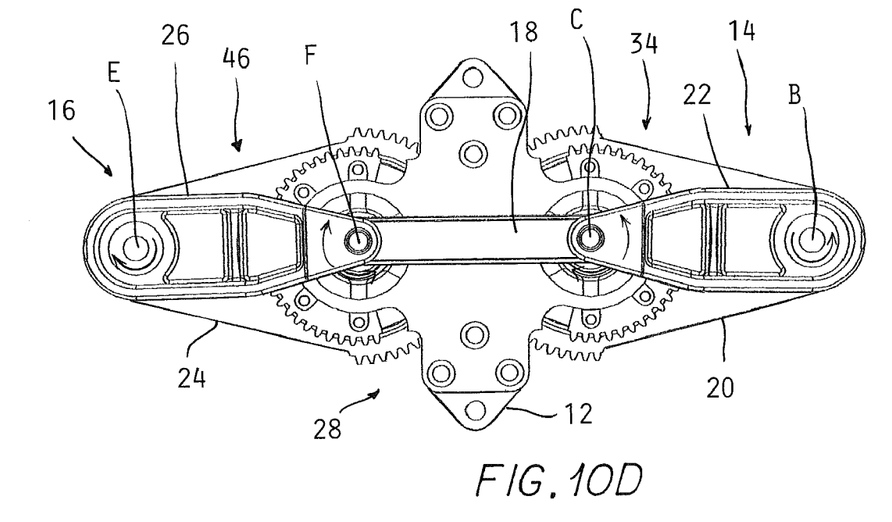
FIG. 10D shows the elevator assembly in the neutral position.
Figure 10E:
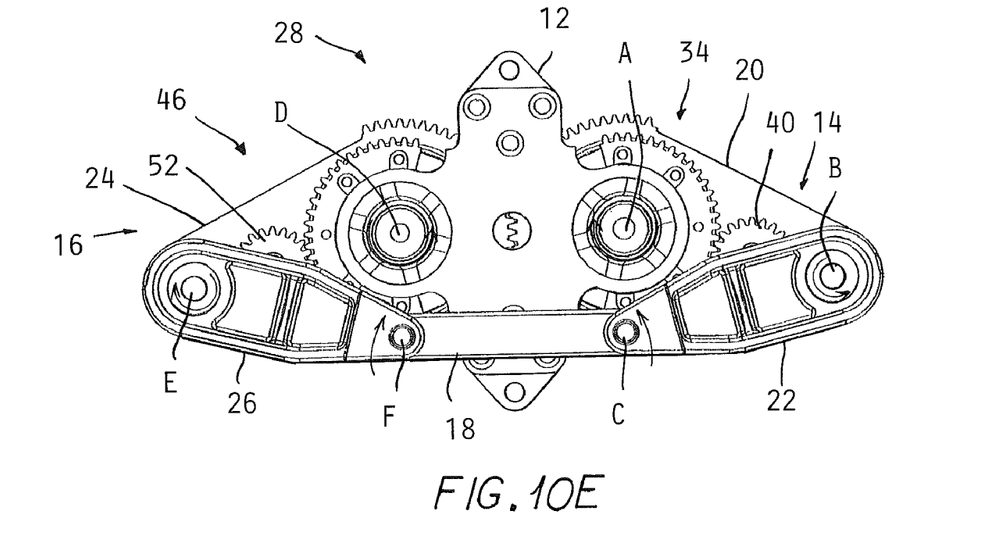
FIG. 10E shows the elevator assembly in an intermediate position between the neutral position and a second extended position.
Figure 10F:
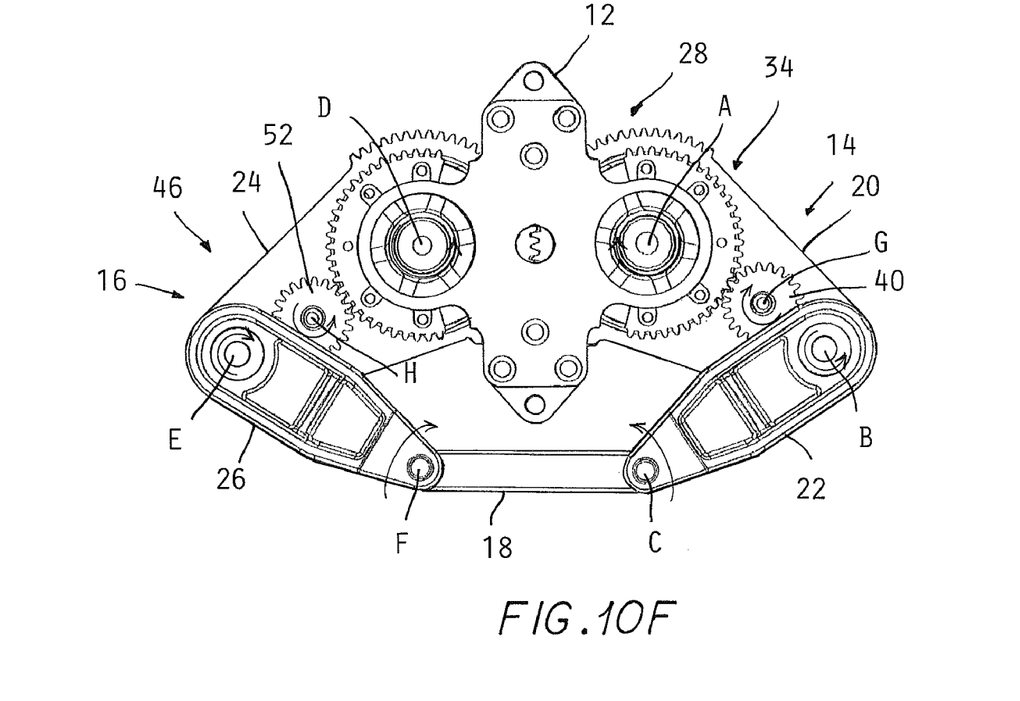
FIG. 10F shows the elevator assembly in an intermediate position between the neutral position and the second extended position.
Figure 10G:
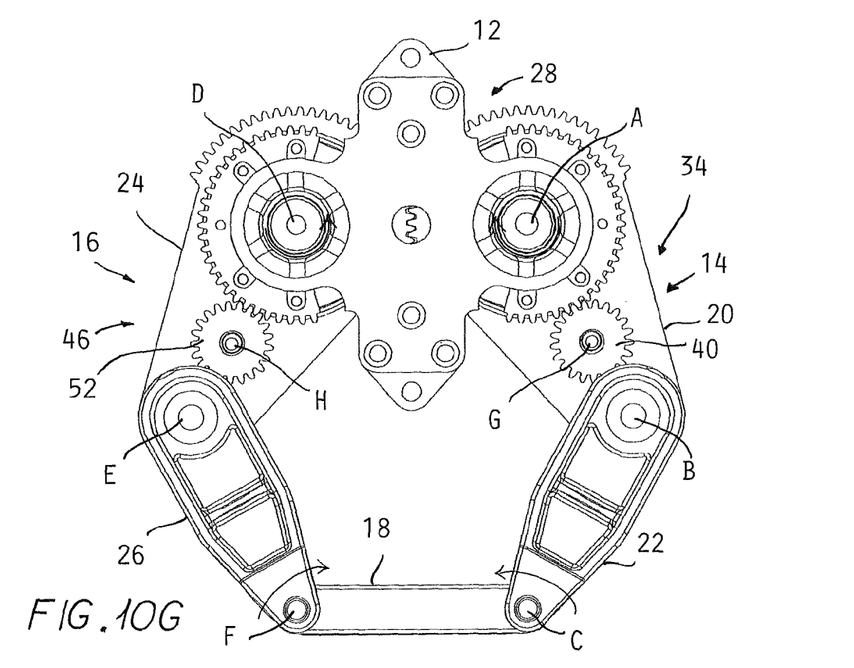
FIG. 10G shows the elevator assembly in an intermediate position between the neutral position and the second extended position.

The interlock gear system 28, the first articulating gear system 34 and the second articulating gear system 46 cooperate to control movement of the support member 18 of the elevator assembly 10 between a neutral position and first and second extended positions, as shown in FIGS. 10A-10H. When the support member 18 of the elevator assembly 10 is in the neutral position, as shown in FIG. 10D, the support member 18 is disposed in front of the carrier 12 such that the distance between the axis A and axis C as well as the distance between axis D and axis F is at or near a minimum value. In particular, the axes A-H are all substantially aligned in a common neutral plane. The secondary portions 22, 26 of the arms 14, 16 are near or at minimum extension with respect to the primary portions 20, 24 of the arms 14, 16, and the secondary portions 22, 26 form angles at or near zero degrees with respect to the primary portions 20, 24 at axes B and E. The secondary portions 22, 26 form angles at or near zero degrees with respect to the support member 18 at axes C and F. Accordingly, the primary portions 20, 24 of the arms 14, 16, the secondary portions 22, 26 of the arms 14, 16, and the support member 18 are all substantially parallel to one another when the support member 18 of the elevator assembly 10 is in the first extended position.

When the support member 18 of the elevator assembly 10 is in the first extended position, as shown in FIG. 10A, the support member 18 is disposed above the carrier 12 at or near a maximum height of the support member 18, such that the support member 18 is above the neutral plane, and the distance between the axis A and axis C as well as the distance between axis D and axis F is at or near a maximum value. The secondary portions 22, 26 of the arms 14, 16 are near or at full extension with respect to the primary portions 20, 24 of the arms 14, 16, and the secondary portions 22, 26 form angles at or near 180 degrees with respect to the primary portions 20, 24 at axes B and E. Accordingly, the primary portions 20, 24 of the arms 14, 16 are substantially parallel to the secondary portions 22, 26 of the arms 14, 16 when the support member 18 of the elevator assembly 10 is in the first extended position. The secondary portions 22, 26 of the arms 14, 16 form angles at or near 90 degrees with respect to the support member 18 at axes C and F. Accordingly, the secondary portions 22, 26 of the arms 14, 16 are substantially perpendicular to the support member 18 when the support member 18 of the elevator assembly 10 is in the first extended position.

Figure 10H:
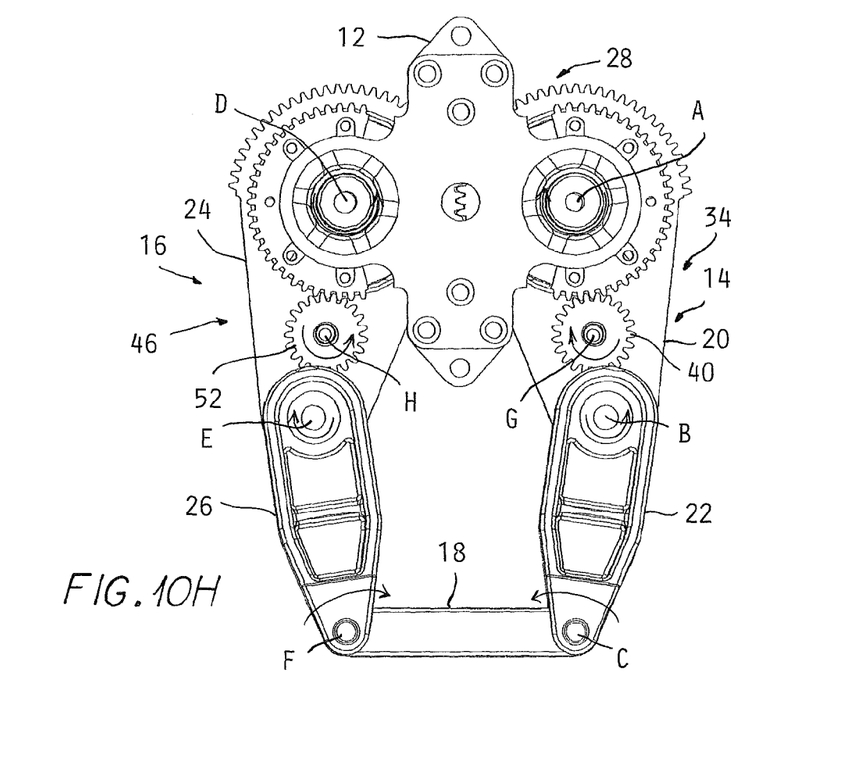
FIG. 10H shows the elevator assembly in the second extended position.

When the support member 18 of the elevator assembly 10 is in the second extended position, as shown in FIG. 10H, the support member 18 is disposed below the carrier 12 at or near a minimum height of the of the support member 18, such that the support member 18 is disposed below the neutral plane, and the distance between the axis A and axis C as well as the distance between axis D and axis F is at or near a maximum value. The secondary portions 22, 26 of the arms 14, 16 are near or at full extension with respect to the primary portions 20, 24 of the arms 14, 16, and the secondary portions 22, 26 of the arms 14, 16 form angles at or near 180 degrees with respect to the primary portions 20, 24 at axes B and E. Accordingly, the primary portions 20, 24 are substantially parallel to the secondary portions 22, 26 of the arms 14, 16 when the support member 18 of the elevator assembly 10 is in the second extended position. The secondary portions 22, 26 of the arms 14, 16 form angles at or near 90 degrees with respect to the support member 18 at axes C and F. Accordingly, the secondary portions 22, 26 of the arms 14, 16 are substantially perpendicular to the support member 18 when the support member 18 of the elevator assembly 10 is in the second extended position.

As the support member 18 of the elevator assembly 10 moves toward the second extended position from any of the first extended positions, the neutral position, or an intermediate position, the primary portion 20 of the first arm 14 rotates clockwise with respect to the carrier 12 at axis A, while the primary portion 24 of the second arm 16 rotates counter-clockwise with respect to the carrier 12 at axis D. At the same time, the intermediate gear 42 of the first arm 14 rotates clockwise with respect to the primary portion 20 of the first arm 14 at axis G, while the intermediate gear 54 rotates counterclockwise with respect to the primary portion 20 of the second arm 16 at axis H. Clockwise rotation of the intermediate gear 42 of the first arm 14 causes counterclockwise rotation of the secondary portion 22 of the first arm 14 with respect to the primary portion 20 of the first arm 14 at axis B, which in turn causes counterclockwise rotation of the secondary portion 22 of the first arm 14 with respect to the support member 18 about axis C. Similarly, counterclockwise rotation of the intermediate gear 54 of the second arm 16 causes clockwise rotation of the secondary portion 22 of the second arm 16 with respect to the primary portion 20 of the second arm 16 at axis E, which in turn causes clockwise rotation of the secondary portion 22 of the second arm 16 with respect to the support member 18 about axis C. As the support member 18 of the elevator assembly 10 moves toward the first extended position from any of the second extended positions, the neutral position or an intermediate position, the rotations at axes A-G are opposite to those described above.

In use, the elevator assembly 10 may be incorporated into a positioning system 1 that includes one or several of the elevator assemblies 10. A workpiece 4 that is to be positioned in a precise vertical position is placed either on the support member 18 of the elevator assembly 10 or on the carriage 3 if multiple elevator assemblies are incorporated in the positioning system 1. To change the height of the workpiece 4, one or more of the servo motors 5 are energized to drive movement of the first and second arms 14, 16 of the elevator assemblies.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. An elevator assembly, comprising:
   a carrier;
   a first arm and a second arm, each arm having a primary portion pivotally connected to the carrier, and a secondary portion pivotally connected to the primary portion;
   a first gear system that interconnects the first arm and the second arm for synchronous rotation with respect to the carrier in opposite directions;
   a pair of second gear systems that establish a geared relationship between the secondary portions of the arms and the carrier;
   a support member connected to the secondary portions of the arms, wherein rotation of the primary portions of the arms with respect to the carrier drives the support member between a neutral position and at least a first extended position;
   each second gear system having a first plurality of gear teeth connected to the carrier in a fixed angular relationship with respect to the carrier;
   each second gear system having a second plurality of gear teeth connected to the secondary portion of the respective arm in a fixed angular relationship therewith, wherein the second plurality of gear teeth are in a geared relationship with the first plurality of gear teeth; and
   each second gear system having at least one intermediate gear to provide the geared relationship between the first plurality of gear teeth and the second plurality of gear teeth.

2. The elevator assembly of claim 1, wherein the intermediate gears are pivotally mounted to respective primary portions of the first and second arms.

3. An elevator assembly, comprising:
   a carrier;
   a first arm and a second arm, each arm having a primary portion pivotally connected to the carrier, and a secondary portion pivotally connected to the primary portion;
   a first gear system that interconnects the first arm and the second arm for synchronous rotation with respect to the carrier in opposite directions;
   a pair of second gear systems that establish a geared relationship between the secondary portions of the arms and the carrier;
   a support member connected to the secondary portions of the arms, wherein rotation of the primary portions of the arms with respect to the carrier drives the support member between a neutral position and at least a first extended position;
   the primary portion of the first arm connected to the carrier at a first joint; and
   the primary portion of the second arm connected to the carrier at a second joint, wherein a neutral plane is defined through the first joint and the second joint, wherein the support member travels along a line of action that is substantially perpendicular to the neutral plane and the support member extends along the neutral plane when the support member is in the neutral position.

4. The elevator assembly of claim 3, further comprising:
   the support member is disposed on a first side of the neutral plane when the support member is in the first extended position; and
   the support member moveable to a second extended position, and the support member is disposed on a second side of the neutral plane when the support member is in the second extended position.

5. The elevator assembly of claim 3, wherein the support member remains substantially parallel to the neutral plane as it moves between the neutral position and the first extended position.

6. An elevator assembly, comprising:
   a carrier;
   a first arm and a second arm, each arm having a primary portion pivotally connected to the carrier and a secondary portion pivotally connected to the primary portion;
   a first gear system that interconnects the first arm and the second arm so that rotation of the primary portion of the first arm with respect to the carrier induces rotation of the primary portion of the second arm with respect to the carrier;
   a pair of second gear systems each provided on one of the first arm or the second arm to establish a geared relationship between the secondary portions of the arms and the carrier so that rotation of the primary portions of the arms with respect to the carrier induces rotation of the secondary portions of the arms with respect to the primary portions of the arms, each second gear system having a first plurality of gear teeth connected to the carrier in a fixed angular relationship with respect to the carrier and each second gear system having a second plurality of gear teeth connected to the secondary portion of the respective arm in a fixed angular relationship therewith, wherein the second plurality of gear teeth are in a geared relationship with the first plurality of gear teeth;
   a support member having a first end connected to the secondary portion of the first arm and a second end connected to the secondary portion of the second arm, wherein rotation of the primary portions of the arms with respect to the carrier drives the support member between a neutral position and at least a first extended position;

the first gear system having a third plurality of gear teeth connected to the primary portion of the first arm; and the first gear system having a fourth plurality of gear teeth connected to the primary portion of the second arm, wherein meshing engagement of the third plurality of gear teeth and the fourth plurality of gear teeth interconnect the first arm and the second arm.

7. The elevator assembly of claim 6, further comprising:
each second gear system having at least one intermediate gear to provide the geared relationship between the first plurality of gear teeth and the second plurality of gear teeth.

8. The elevator assembly of claim 7, wherein the intermediate gears are pivotally mounted to respective primary portions of the first and second arms.

9. The elevator assembly of claim 6, further comprising:
the primary portion of the first arm connected to the carrier at a first joint; and the primary portion of the second arm connected to the carrier at a second joint, wherein a neutral plane is defined through the first joint and the second joint, wherein the support member travels along a line of action that is substantially perpendicular to the neutral plane and the support member extends along the neutral plane when the support member is in the neutral position.

10. The elevator assembly of claim 9, further comprising:
the support member is disposed on a first side of the neutral plane when the support member is in the first extended position; and the support member moveable to a second extended position, and the support member is disposed on a second side of the neutral plane when the support member is in the second extended position.

11. The elevator assembly of claim 9, wherein the support member remains substantially parallel to the neutral plane as it moves between the neutral position and the first extended position.

12. The elevator assembly of claim 6, further comprising:
the primary portion of the first arm, the secondary portion of the first arm, the primary portion of the second arm and the secondary portion of the second arm all extend substantially parallel to one another in the neutral position.

* * * * *